United States Patent

Torii et al.

[11] Patent Number: 5,394,705
[45] Date of Patent: Mar. 7, 1995

[54] FLAVORED ICE AND MANUFACTURING METHOD FOR THE SAME

[75] Inventors: Sohei Torii, Gyoda; Keiichiro Torii, Kumagaya, both of Japan

[73] Assignee: Torii Food Products Co., Ltd., Saitama, Japan

[21] Appl. No.: 218,204

[22] Filed: Mar. 25, 1994

[30] Foreign Application Priority Data

Aug. 27, 1993 [JP] Japan .................. 5-213245

[51] Int. Cl.$^6$ ............................. F25C 5/04
[52] U.S. Cl. ........................... 62/74; 62/320
[58] Field of Search ............... 62/340, 74, 75

[56] References Cited

U.S. PATENT DOCUMENTS

| 2,498,645 | 2/1950 | Bobby | 62/75 |
| 4,745,773 | 5/1988 | Ando | 62/320 |
| 5,042,261 | 8/1991 | Yeakel et al. | 62/320 X |

FOREIGN PATENT DOCUMENTS 1-281382  11/1989  Japan .

Primary Examiner—William E. Tapolcai
Attorney, Agent, or Firm—Kane, Dalsimer, Sullivan, Kurucz, Levy, Eisele & Richard

[57] ABSTRACT

The present invention provides a flavored ice manufacturing method for manufacturing flavored ice with a taste and smell possessing a uniform color or is colorless, which comprises a block ice manufacturing process; a crushing process for crushing this manufactured block ice into ice particles; and a sorting process for sorting these crushed ice particles into flavored ice of a predetermined particle diameter. In the sorting process, the ice particles are sorted into flavored ice of a predetermined particle diameter while spraying a dry-cooling fluid of 0° C. or less onto the ice particles. As a result, a dry-cooling liquid is sprayed around the periphery of these ice particles, and thus the surface temperature of these ice particles can be maintained at a low temperature, and the water component existing around the periphery can be blown away. In this manner, adhesion of water and minute particles to the surface of the ice particles, as well as adhesion of neighboring ice particles is prevented. Consequently, the taste sensation of the flavored ice. as well as the separation workability of the ice particles can be improved. In addition, the present invention provides flavored ice with an improved taste possessing a particle size within a predetermined range, which is difficult to melt, and in which there is no adhesion.

6 Claims, 5 Drawing Sheets

FLAVORED ICE AND MANUFACTURING METHOD FOR THE SAME

BACKGROUND OF THE INVENTION

1. Field of the Invention

The present invention relates to flavored ice and a method for manufacturing the same, which can be used for various uses in place of commercially-available block ice, and wherein tasty additives are added.

2. Relevant Art

Flavored ice, for example, ice candy, as well as flavored ice particles which are mixed into ice cream, are commonly known as "pigmented ice". Ice candy is normally produced by adding syrup and coloring pigments to water, and then, for example, placing this mixture in a closed tubular container, and cooling the periphery of this container, thereby freezing the water inside the container into ice. In addition, the aforementioned pigmented flavored ice particles are produced by dripping colored water, to which the coloring pigments have been added, onto liquid nitrogen, such that this water is instantaneously frozen; and/or by freezing a specific syrup in an ice-making apparatus.

Recently, block ice without color shades which have been uniformly pigmented have been proposed. When manufacturing flavored ice from this block ice, the block ice is crushed into ice particles by means of a roll-type crusher, and flavored ice of a predetermined diameter are then sorted by passing the aforementioned ice particles through a sieve: this flavored ice is then packed in a closed tubular container.

However, when sorting the crushed ice particles into flavored ice of a predetermined diameter in a factory environment, since the relative surface area of the ice particles is greater than that of the block ice, the surface temperature of the ice particles increases, water in the air within the room adheres to the surface of these ice particles, and neighboring ice particles are drawn together. In addition, there is also the case in which fine particles of ice adhere to the ice particles. As a result, the particle diameters of the ice particles change over time, and it becomes increasingly difficult to sort out ice particles of a predetermined particle diameter. Additionally, the sieved flavored ice sticks together, and fine particles adhere to the ice particles, thereby degrading the taste of the flavored ice.

In addition, due to the crushing of the ice block into ice particles within a chamber such as a factory or the like, there exists the fear that the water component in the air inside the operating chamber will adhere to the surface of the ice particles, thereby producing ice particles which are stuck together. In this manner, there are numerous cases in which the particle diameter of the ice particles increases due to adherence of neighboring ice particles, and there remains the fear difficulties occurring in the sorting operations, at the time of sieve-sorting of the ice particles.

SUMMARY OF THE INVENTION

It is therefore an object of the present invention to provide flavored ice and a method for manufacturing the same, wherein the separability of the ice particles and the taste of the flavored ice has been improved.

In order to achieve the aforementioned object, the present invention provides a method for manufacturing flavored ice possessing a flavor and a fragrance which is uniformly colored or non-colored which comprises: a block ice manufacturing process for manufacturing block ice; a crushing process for crushing the block ice manufactured in the aforementioned block ice manufacturing process into ice particles; and a sorting process for sorting the ice particles crushed in the aforementioned crushing process into flavored ice of a predetermined particle diameter, wherein in the above-mentioned sorting process, the aforementioned ice particles are sorted into flavored ice of a predetermined particle size while pouring over these ice particles a dry-cooling fluid of a temperature of 0° C. or less.

In the aforementioned crushing process, it is also possible to crush the block ice into the ice particles while pouring the above-mentioned dry-cooling fluid of 0° C. or less over this block ice.

In the aforementioned block ice manufacturing process, it is also possible to dissolve a coloring pigment or the like in water to form a uniform color, and then spray or drip this uniformly colored solution onto the wall of an ice-making vessel or the like, which has been cooled to −5° to −30° C. The ice is subsequently grown to produce block ice. Furthermore, in the aforementioned block ice manufacturing method, it is preferable to manufacture the block ice by means of continuously pumping up the nonfrozen colored water from the bottom of the wall of an ice-making vessel or the like, and then mixing this colored water with the starting material colored water, recirculating, and then pouring again from the upper portion of the wall of the ice-making vessel or the like. The ice is then grown to produce the block ice.

In addition, the present invention also provides flavored ice obtained by means of the aforementioned flavored ice manufacturing method. It is also possible to incorporate synthetic sweetening agents into this flavored ice.

DETAILED DESCRIPTION OF THE PREFERRED EMBODIMENTS

Figure 1:
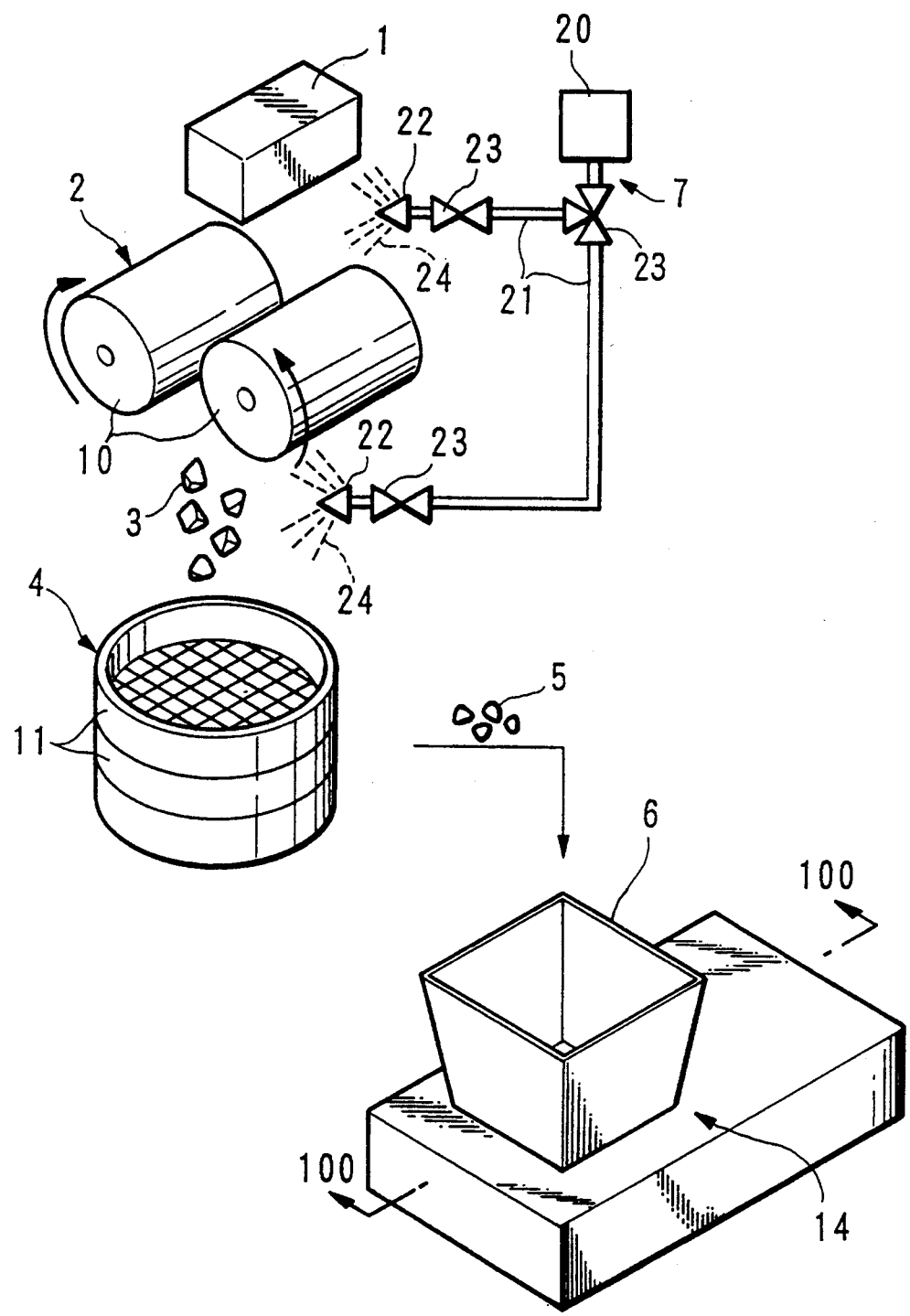
FIG. 1 is a structural diagram showing the entire process of a block ice manufacturing method.

In the following, a preferred embodiment of the flavored ice and manufacturing method for the same according to the present invention will be explained with reference to FIGS. 1 through 5. As shown in FIG. 1, there is provided block ice 1, a crusher 2 for crushing block ice 1 into ice particles 3, a sorter for sorting the ice particles 3 into flavored ice 5 of a predetermined particle diameter, a storing vessel 6 for storing the flavored ice 5 sorted by means of sorter 4, and a cooling body 7 for cooling block ice 1 and ice particles 3. This cooling body 7 may be used in any of the processes mentioned hereafter.

In crusher 2, a roll-type crusher, as shown in the figure, may be employed. This roll-type crusher comprises a pair of cylindrical bodies 10 which are aligned, and between which is formed a space (not shown in the figures) into which block ice 1 is inserted. At the periphery of each of these cylindrical bodies 10, a surface layer (not shown in the figures) is formed for preventing rises in the surface temperature of block ice 1.

Above, as crusher 2, a roll-type crusher was employed; however, any commercially-available crusher such as a jaw crusher, mill, or the like may be used.

In sorter 4, a vibrating strainer, as shown in the figures, is used. This vibrating strainer sieves ice particles 3 into flavored ice 5 of a predetermined diameter, and comprises a plurality of sieves 11 which ensure that flavored ice 5 possesses a particle diameter within a predetermined range, and a vibrating body (not shown in the figures) for vibrating these sieves 11. As mentioned above, as sorter 4, a vibrating strainer is used; however, any sorter commercially available may be employed.

Cooling body 7 comprises a cooling source 20 filled with liquid nitrogen 24 (dry-cooling fluid), a duct 21 which communicates with this cooling source 20 for supplying liquid nitrogen 24, a sprayer 22 which is installed at the front end portion of this duct 21 for spraying liquid nitrogen 24 in a mist state, and a plurality of valves 23 which are arranged in duct 21 for regulating the flow amount of liquid nitrogen 24. This cooling body 7 allows the flow of liquid nitrogen 24 inside the duct 21 from cooling source 20, and sprays this liquid nitrogen 24 from sprayer 22 via this duct 21. Sprayer 22 is arranged at each of the installation positions of crusher 2 and sorter 4. In other words, a sprayer 22 is arranged above crusher 2 at a position from which it can spray liquid nitrogen onto block ice 1 and into crusher 2. On the other hand, a sprayer 22 is also arranged above sorter 4. As a result, sprayers 22 are arranged at positions from which liquid nitrogen is sprayed onto ice particles 3 crushed in crusher 2, and ice particles inside sorter 4. It is also possible to arrange a sprayer 22 in either crusher 2 or sorter 4, as long as the block ice 1 is sufficiently cooled.

In the aforementioned, liquid nitrogen 24 is used as the dry-cooling fluid; however, it is also possible to gasify carbon gas from dry ice, and spray this carbon gas at a temperature of 0° C. or less. In addition, it is also possible to spray air cooled to a temperature of 0° C. or less.

Figure 2:
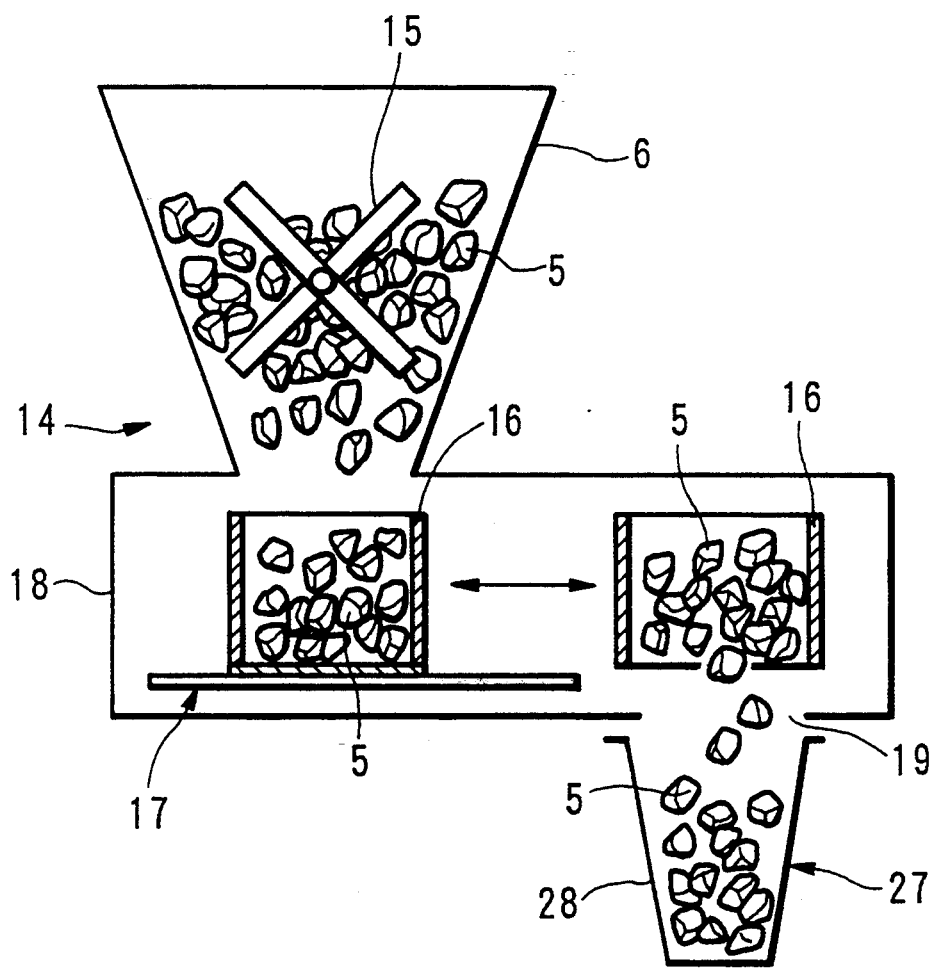
FIG. 2 is a cross sectional diagram taken along the 100—100 line of FIG. 1.

As storing vessel 6, a hopper for storing sorted flavored ice 5 is used. This hopper comprises a hollow hopper base 12 for packing flavored ice 5, a lid cover (not shown in the figures) which is installed in the upper portion of the aforementioned hopper base 12 in a manner such that it opens and closes, and a weighing device 14 which is provided at the bottom portion of hopper base 12 for weighing flavored ice 5, as shown in FIG. 2.

This weighing device 14 is constructed from stirrer 15 which is provided inside of hopper base 12, and a sliding device 17 which communicates with the bottom portion of hopper base 12 for sliding a cylindrical weighing vessel 16 contained in the inner portion therein. Stirrer 15 mixes the flavored ice 5 by pushing it in a fixed direction within hopper base 12. Sliding device 17 is formed from casing 18 which is provided in the bottom portion of hopper base 12 for housing weighing vessel 16, and a movable body (not shown in the figures) for packing flavored ice 5 from the bottom portion of hopper base 12 into weighing vessel 16, and for moving this weighing vessel 16 in an approximately horizontal direction over a predetermined interval. In casing 18, a flavored ice aperture 19 is provided at a position at the end of the aforementioned interval from the bottom portion of hopper base 12, for dropping the flavored ice 5 inside weighing vessel 16.

Figure 3:
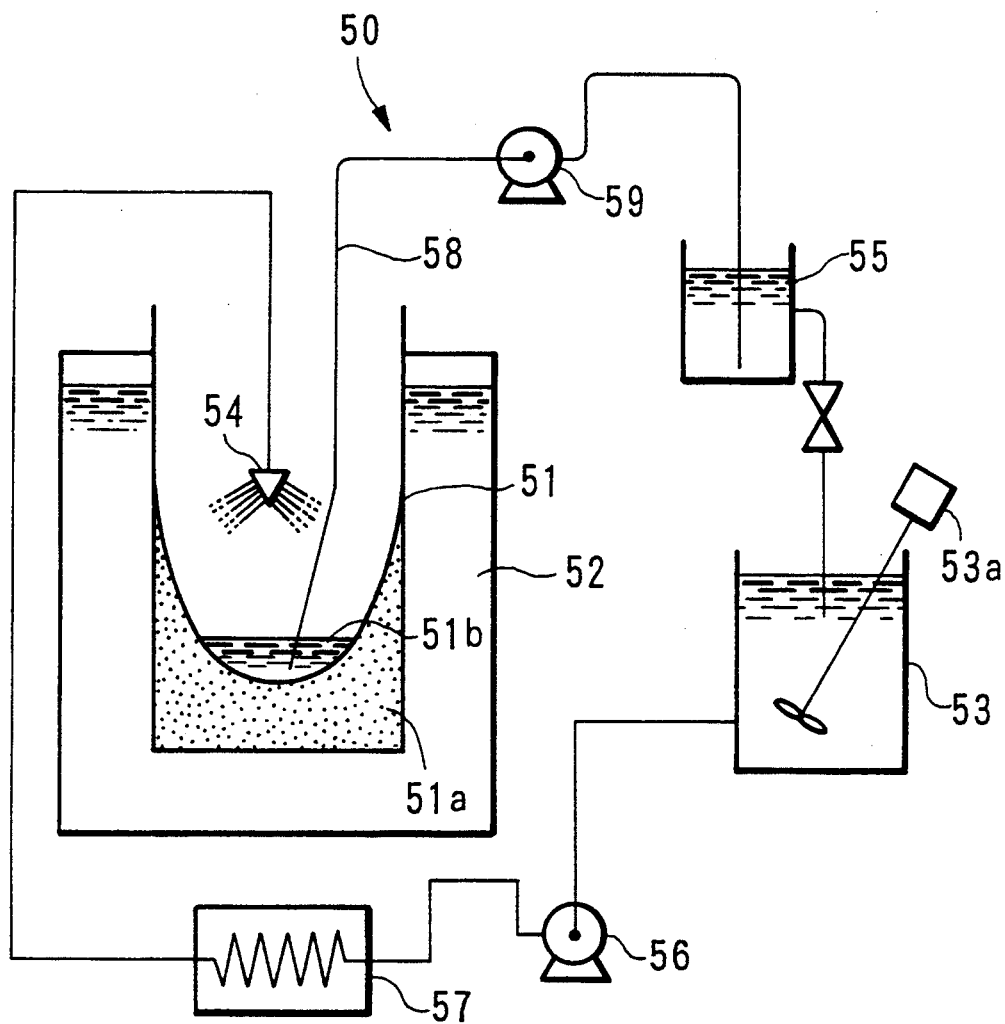
FIG. 3 is a structural diagram showing a flavored ice manufacturing process.

In addition, a block ice manufacturing apparatus for manufacturing block ice 1 will now be explained using FIG. 3. As shown in FIG. 3, this block ice manufacturing apparatus 50 comprises an ice-making vessel 51 for freezing colored water, a brine 52 which is arranged around the outer portion of this ice-making vessel 51 for cooling the ice-making vessel 51 to a temperature of $-5°$ to $-30°$ C., a colored water producing tank 53 for producing colored water to supply to ice-making vessel 51, spraying apparatus 54 for spraying the colored water inside of colored water producing tank 53 in the direction of the inner wall of ice-making vessel 51, and deaerating tank 55 for storing colored water sprayed from spraying apparatus 54 which is yet to be frozen, and for deaerating the air within this colored water.

In colored water producing tank 53, a stirrer 53a for stirring the colored water inside this colored water producing tank 53 is installed, and a pump 56 is connected to this colored water producing tank 53 for sending the colored water therein to sprayer 54. In between sprayer 54 and pump 56, a chiller 57 for cooling the colored water flowing between the aforementioned devices to a temperature of 0° to 1° C. is arranged therein. It is also possible to incorporate artificial sweetening agents into this colored water producing tank 53. As an example of the sweetening agent, aspartame (product name, produced by Ajinomoto Co., Inc.) may be used in an amount of 0.005 to 0.2% by weight of block ice 1, and preferably 0.05 to 0.1% by weight.

Figure 4:
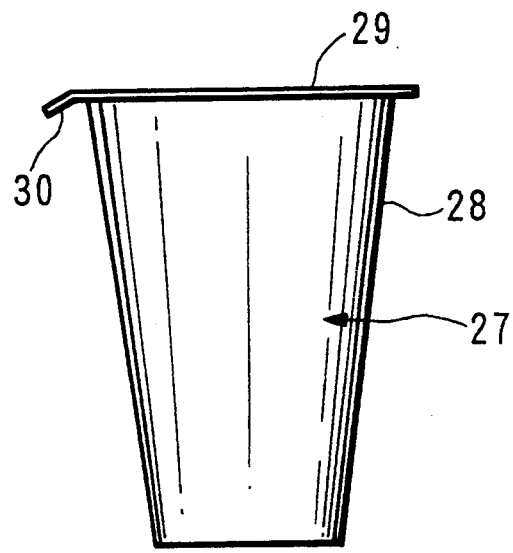
FIG. 4 is a side surface view showing a container packed with the flavored ice of FIG. 2.
Figure 5:
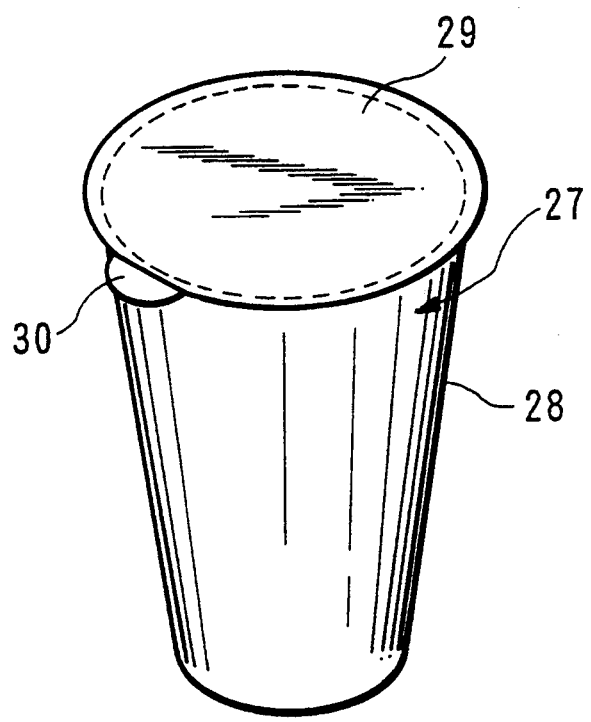
FIG. 5 is an inclined diagram of FIG. 4.

Deaeration tank 55 communicates with suction tube 58 which is arranged inside of ice-making can 51, and colored water producing tank 53 suction tube 58 communicates with deaeration tank 55 via pump 59. In addition, a container 28, as shown in FIGS. 4 and 5 is used as the vessel for packing flavored ice 5. This container 28 is formed from a closed tubular container base 27 in which flavored ice 5 is packed, and seal 29 which is affixed around the entire opening of the aforementioned container base 29. A tab 30 which protrudes outwardly toward the exterior is formed unitarily with seal 29.

In the following, an explanation of the manufacturing process for the flavored ice will be given. This flavored ice manufacturing method comprises a block ice manufacturing process for producing block ice 1, a crushing process for crushing the block ice 1 formed in the aforementioned block ice manufacturing process into ice particles 3, a sorting process for sorting the ice particles 3 formed in the aforementioned crushing process into flavored ice 5 of a predetermined particle diameter, a storing process for storing the flavored ice sorted in the aforementioned sorting process, and a packing process for packing the flavored ice which is stored in the aforementioned storing process into a container 27.

Figure 6:
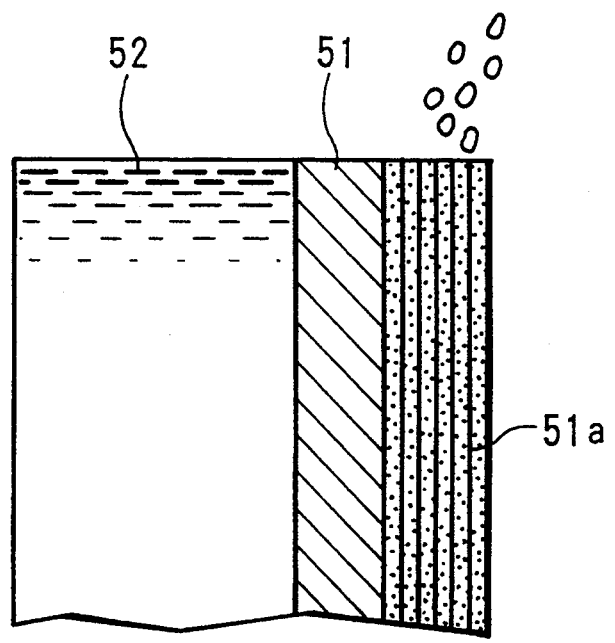
FIG. 6 is a cross sectional diagram for the purpose of explaining the freezing of the colored water in the flavored ice manufacturing process.

As shown in FIG. 3, in the aforementioned block ice manufacturing process, a coloring pigment or the like is dissolved into water in colored water producing tank 53 producing a uniform color. In colored water producing tank 53, it is possible to dissolve a commercially-available syrup, coloring pigment, or the like, into the water and furthermore, it is also possible to incorporate an artificial sweetening agent such as aspartame, sterbia, and the like, in the amount of 0.005 to 0.2% by weight, preferably 0.05 to 0.1% by weight of the block ice. The colored water inside colored water producing tank 53 is then cooled to a temperature of 0° to 1° C. by means of chiller 57 and then sent to spraying device 54. Chiller 57 pre-cools colored water and increases the freezing efficiency inside ice-making vessel 51, and hence, a low temperature is preferred within a range in which the colored water does not freeze. The colored water is then sprayed from spraying device 54 in the direction of the inner wall of ice-making vessel 51. At this time, in order to change the physical properties of block ice 1, it is also possible to pour the colored water by dripping it along the inner wall of ice-making vessel 51 from the upper portion therein. Ice-making vessel 51 is cooled by means of the brine 52 to a temperature of $-5°$ to $-30°$ C. In the case where this cooling temperature is greater than $-5°$ C., freezing becomes poor, and, on the other hand, when this cooling temperature is less than $-30°$ C., economic efficiency is lost. The colored water sprayed out from spraying device 54 is sprayed towards the inner surface of ice-making vessel 51. In place of the aforementioned spraying device 54, it is also possible to use a method in which syrup is allowed to drip from a syrup nozzle. The colored water is frozen in approximately the amount flowing over the surface of freezing portion 51a; in other words, as shown in FIG. 6, when this colored water flows along the inner wall of ice-making vessel 51 towards the lower portion therein, this colored water is cooled and frozen while passing over the inner wall of ice-making vessel 51 which is cooled by means of brine 52. In the meantime, colored water 51b which has not yet been frozen, accumulates at the bottom portion of freezing portion 51a. This non-frozen colored water 51b is instantly drawn into suction tube 58 and removed. This colored water is then introduced into colored water producing tank 53 and recirculated into ice-making vessel 51. The colored water which flows over freezing portion 51a is frozen without separation of the coloring pigment, and this freezing portion 51a becomes block ice 1 which is accordingly uniformly colored. In addition, the suction tube 58 is moved up and down at regular intervals in order to avoid freezing, and its front tip is positioned at the bottom portion of freezing portion 51a for drawing up non-frozen colored water such that only a very small amount of this non-frozen colored water remains behind.

Furthermore, in the block ice manufacturing process above, brine 52 is arranged around the outer portion of ice-making vessel 51, and the ice is grown in the inner portion of this ice-making vessel 51; however, it is also possible to provide the above-mentioned brine inside ice-making vessel 51 and grow the ice using the outer wall of this ice-making vessel 51. In this case, colored water is poured onto the outer wall of ice-making vessel 51 by means of spraying or dripping, and the ice is grown along the outer wall of this icemaking vessel 51. Furthermore, in the above block ice manufacturing process, a wall, i.e., the inner wall or outer wall of ice-making vessel 51, was employed; however, it is also possible to use a diaphragm for partitioning brine 52 and colored water as the above-mentioned wall.

In this manner, the block ice 1 is manufactured, and this block ice is then crushed in the crushing process. In the crushing process, block ice 1 is placed into a crusher 2 (roll-type crusher) and crushed into ice particles 3. At this time, valve 23 is opened, and block ice 1 is crushed into ice particles 3 while spraying liquid nitrogen 24 (dry cooling fluid of temperature 0° C. or less) from sprayer 22 onto this block ice 1.

In the sorting process, the ice particles 3 which were crushed by using crusher 2 are placed on a sieve 11, and these ice particles 3 are sorted into flavored ice 5 of a predetermined particle diameter by means of vibrating sieve 11 while spraying liquid nitrogen (dry cooling fluid of 0° C. or less) onto the ice particles 3 resting on this sieve 11.

In the storing process, flavored ice which is sorted according to a predetermined particle size in the aforementioned sorting process is placed in a storing vessel 6, such as a hopper, according to each particle size, and then stored at a low temperature in this storing vessel 6.

In the packing process, weighing apparatus 14 is operated, and flavored ice 5 is stirred by means of stirrer 14, thereby preventing the adhering of neighboring flavored ices 5. Stirrer 15 is then operated along with sliding device 17. After a fixed quantity of flavored ice is packed into weighing vessel 16, this weighing vessel 16 is slid by means of sliding device 17 in a manner such that the flavored ice 5 inside of this weighing vessel 16 drop from flavored ice aperture 19, thereby filling container base 28 with this flavored ice 5. Subsequently, by means of affixing seal 29 around the peripheral opening of container base 28, the flavored ice 5 is packed into container 27.

According to the aforementioned flavored ice manufacturing method, which comprises a block ice manufacturing process for manufacturing block ice 1, a crushing process for crushing the block ice 1 manufactured in block ice manufacturing process into ice particles 3, and a sorting process for sorting the ice particles 3 crushed in the aforementioned crushing process into flavored ice 5 of a predetermined particle size, the aforementioned ice particles 3 are sieved to produce flavored ice 5 of a predetermined particle size while spraying liquid nitrogen 24 over these ice particles 3 lying on sieve 11 in the aforementioned sorting process, and thus, liquid nitrogen flows around the circumference of a relatively large surface area of the ice particles 3. As a result, the surface temperature of the particles 3 can be set to the freezing point or below, and the water component of air from around the circumference of the ice particles 3 can be blown away using liquid nitrogen 24, and the adherence of water, minute particles, and the like to the surface of the ice particles 3, as well as the adhesion of neighboring ice particles 3 can both be prevented. Consequently, changes in the particle size of the ice particles 3 over the passage of time can be prevented, ice particles 3 of a predetermined diameter can be maintained, and these ice particles 3 can be easily separated using a sieve 11. In addition, since the surface temperature of the ice particles 3 can be maintained at or below freezing point, adhesion of neighboring ice particles 3 can be prevented, and the taste sensation of the flavored ice 5 can be improved.

On the other hand, according to the crushing process, the aforementioned block ice 1 is crushed into ice particles 3 while spraying liquid nitrogen 24 on the block ice 1 and crusher 2, thus at the time of crushing into ice particles 3, liquid nitrogen can be sprayed around the periphery of these ice particles 3. As a result, at the the time of crushing into ice particles 3, the water component existing around the periphery of the aforementioned ice particles can be reduced, adhesion of this water to the ice particles 3 can be prevented, separation workability can be improved, adhesion of neighboring ice particles can be prevented, and the taste sensation of the flavored ice 5 can be maintained.

Consequently, according to the above-described flavored ice manufacturing method, flavored ice 5 possessing an improved taste with a particle size within a predetermined range can be produced wherein neighboring particles do not adhere to one another.

In addition, since synthetic sweetening agents are incorporated into the block ice 1, flavored ice 5 possessing an improved taste can be provided which. is difficult to melt.

What is claimed is:

1. A flavored ice manufacturing method for manufacturing flavored ice with a taste and smell possessing a uniform color or is colorless, which comprises the steps of:
   manufacturing block ice;
   crushing said manufactured block ice into ice particles; and
   sorting said crushed ice particles into ice of a predetermined particle diameter;
   and which is characterized in that said ice particles are sorted into ice of a predetermined particle diameter while spraying a dry-cooling fluid of 0° C. or less onto said ice particles.

2. A flavored ice manufacturing method as stated in claim 1, wherein said block ice is crushed into said ice particles while spraying a dry-cooling fluid of 0° C. or less onto said block ice.

3. A flavored ice manufacturing method as stated in claim 1, wherein said block ice is manufactured by dissolving a coloring pigment into water to form uniformly colored water; spraying or dripping said uniformly colored water from the exterior onto a wall of an ice-making vessel which is cooled to a temperature of −5° to −30° C.; and growing ice produced therein.

4. A flavored ice manufacturing method as stated in claim 3, wherein said block ice is manufactured by growing ice produced therein; and by gradually pouring a uniformly colored water from the upper portion of a wall of said ice-making vessel, continuously pumping up non-frozen colored water from the bottom of said wall of said ice-making vessel, mixing said non-frozen colored water with a starting material colored water, and recirculating and pouring the mixed colored water from the upper portion of said wall of said ice-making vessel to grow the ice.

5. Flavored ice manufactured by means of said flavored ice manufacturing method stated in claim 1.

6. Flavored ice as stated in claim 5, wherein synthetic sweetening agents are incorporated into said block ice.

* * * * *